United States Patent
Royak (10) Patent No.: US 9,872,574 B2
(45) Date of Patent: Jan. 23, 2018

(54) HANGER AND METHOD

(71) Applicant: Jodie Royak, Santee, CA (US)

(72) Inventor: Jodie Royak, Santee, CA (US)

( * ) Notice: Subject to any disclaimer, the term of this patent is extended or adjusted under 35 U.S.C. 154(b) by 0 days.

(21) Appl. No.: 15/192,494

(22) Filed: Jun. 24, 2016

(65) Prior Publication Data

US 2016/0338512 A1    Nov. 24, 2016

Related U.S. Application Data (63) Continuation-in-part of application No. 14/943,458, filed on Nov. 17, 2015, now Pat. No. 9,392,890, which is a continuation-in-part of application No. 14/717,199, filed on May 20, 2015, now abandoned.

(60) Provisional application No. 62/171,834, filed on Jun. 5, 2015.

(51) Int. Cl.
*A47G 1/20* (2006.01)
*A47G 1/16* (2006.01)
*F16M 13/02* (2006.01)

(52) U.S. Cl.
CPC .............. *A47G 1/205* (2013.01); *A47G 1/162* (2013.01); *F16M 13/02* (2013.01)

(58) Field of Classification Search
CPC . A47G 1/16; A47G 1/162; A47G 1/20; A47G 1/205; A47G 1/1633; B25H 7/04; Y10T 29/49826
See application file for complete search history.

(56) References Cited

U.S. PATENT DOCUMENTS

| | | | |
|---|---|---|---|
| 5,398,906 A | 3/1995 | Aydelott | |
| 7,836,604 B2 * | 11/2010 | Paharik | A47G 1/1606 33/613 |
| 8,898,945 B2 | 12/2014 | Miller | |
| 2009/0165319 A1 | 7/2009 | Gallien | |
| 2009/0193674 A1 | 8/2009 | Megahed | |
| 2009/0224116 A1 | 9/2009 | Gallien | |
| 2013/0232840 A1 * | 9/2013 | Miller | A47G 1/162 40/757 |

FOREIGN PATENT DOCUMENTS

DE    202005014096 U1 *  11/2005  ............. A47G 1/162

OTHER PUBLICATIONS

Machine Translation of DE 20 2005 014096 U1.*
International Search Report and Written Opinion for International Application No. PCT/US2016/029342 dated Aug. 16, 2016 in 10 pages.

* cited by examiner

*Primary Examiner* — David Bryant
*Assistant Examiner* — Lee A Holly
(74) *Attorney, Agent, or Firm* — Procopio Cory Hargreaves and Savitch LLP (57) ABSTRACT

A method of using a hanger and marking device includes holding an article adjacent to a wall and determining the exact desired location on the wall for hanging the article; exerting pressure on the article so as to cause a support marker of the device to create a small indent in the wall at the desired location; temporarily anchoring the article to the wall with the support marker of the device; stepping back from the wall and observing the temporarily anchored article on the wall; removing the article from the wall; nailing a nail into the wall at the location marked by the device; hanging the article on the wall by mounting the device with article onto the wall-mounted nail.

5 Claims, 11 Drawing Sheets

HANGER AND METHOD

CROSS REFERENCE TO RELATED APPLICATIONS

This application is a continuation-in-part of U.S. Nonprovisional patent application Ser. No. 14/943,458 filed Nov. 17, 2015, which is a continuation-in-part of U.S. Nonprovisional patent application Ser. No. 14/717,199 filed May 20, 2015 and claims priority to U.S. Provisional Patent Application No. 62/171,834 filed Jun. 5, 2015, both of which are incorporated by reference herein.

FIELD OF THE INVENTION

The present invention relates in general to picture hangers, and, in particular to combination picture hanger and wall-marking devices for marking on a wall the desired location for the installation of a nail or other support for hanging a picture.

BACKGROUND OF THE INVENTION

Pictures typically include a hanger bracket on a rear side and near a top of the picture for hanging the picture on a wall-mounted nail. Because the hanger bracket is on a rear side of the picture, determining where a nail needs to be mounted on a wall for the desired picture location is challenging, and often involves a trial-and-error process. Either one has to settle with the picture located not quite at the desired location and/or is left with numerous unsightly extra holes in the wall from the trial-and-error process.

U.S. Pat. No. 5,398,906 proposes a wall-marking device that is releasably attachable to a suspension element on the article to be hanged. The attached wall-marking device is used to mark a desired location for placing a nail in the wall. This wall-marking device and/or separation of a wall-marking device from a frame hanger creates multiple issues. First, separation of a wall-marking device from a frame hanger causes the burden of having to attach and detach the wall-marking device to/from the frame hanger not designed to receive this wall-marking device before/after marking the desired location for placing a nail on the wall. Also, since all frames and hangers have different sizes and shapes it is difficult to create a single marking device that would easily attach to various hangers. Although U.S. Pat. No. 5,398,906 proposes a variety of forms and shapes to fit different frames and hangers, it does not offer any universal solution. Further, the wall-marking device has to be temporarily attached to the frame or hanger in order to be used, creating an issue of accuracy. A marker that is not permanently attached to a hanger will likely move once a person hanging a picture will put some pressure on it in his or her efforts to identify the best location for a piece of art or other object. That lack of fixation is a potential source of inaccuracy in marking. Moreover, the proposed variety of models (rather than one universal solution) makes it difficult to manufacture and use by those groups of people that it was thought for.

SUMMARY OF THE INVENTION

An aspect of the invention involves a one-piece hanger and marking device for an article to be hung on a wall (e.g., picture, mirror, artwork, arts and crafts, or other article to be hung on a wall) using a wall-mounted nail or support. The device is bracket-shaped and includes flanges with holes at opposite ends for mounting the device via fasteners to a rear of the article to be hung on a wall. The device includes a rear with a support marker for marking a location for placing a nail on the wall. Below the support marker is support receiving recess that receives the nail for mounting the device and article to be hung on a wall on the wall-mounted nail. The device includes angled bottom edges that ride along the wall-mounted nail to guide the support receiving recess onto the wall-mounted nail.

In use, with the device mounted on the top rear of the article to be hung on a wall, a person holds the article to be hung on a wall adjacent to the wall and determines the exact desired location for hanging the article to be hung on a wall. When the desired wall location is determined, pressure exerted on article to be hung on a wall causes the support marker of the device to create a small indent in the wall at the desired location. The article to be hung on a wall is removed from the wall and a nail or other support is nailed into the wall at the location marked by the device. The article to be hung on a wall is then placed against the wall with the device above the wall-mounted nail, and the article to be hung on a wall with device is let down onto the wall-mounted nail, the angled bottom edges riding along the wall-mounted nail to guide the support receiving recess onto the wall-mounted nail so that the article to be hung on a wall and device are mounted to the exact desired location for hanging the article to be hung on a wall.

Another aspect of the invention involves a one-piece hanger and marking device for an article to be hung on a wall comprising flange sections with holes at opposite ends for mounting the one-piece hanger and marking device via fasteners to a rear of the article to be hung on a wall; a central section bridging the flange sections, the central section include a front surface and a rear surface; and a support marker protruding from the rear surface of the central section for marking a location for mounting a nail on a wall for mounting the article to be hung on a wall.

One or more implementations of the aspect of the invention described immediately above include one or more of the following: the central section includes a support receiving recess below the support marker that receives the nail for mounting the device and article to be hung on a wall on the wall-mounted nail; and/or the central section includes a top edge and angled bottom edges that ride along the wall-mounted nail to guide the support receiving recess onto the wall-mounted nail.

A further aspect of the invention involves a method of using the one-piece hanger and marking device described for hanging an article to be hung on a wall. The method includes holding the article to be hung on a wall adjacent to the wall and determining the exact desired location on the wall for hanging the article to be hung on a wall; exerting pressure on the article to be hung on a wall so as to cause the support marker of the device to create a small indent in the wall at the desired location; removing the article to be hung on a wall from the wall; nailing the nail into the wall at the location marked by the one-piece hanger and marking device; and hanging the article to be hung on a wall on the wall by mounting the one-piece hanger and marking device with article to be hung on a wall onto the wall-mounted nail.

In an implementation of the aspect of the invention described immediately above, the central section includes a support receiving recess below the support marker that receives the nail for mounting the device and article to be hung on a wall on the wall-mounted nail, the central section includes a top edge and angled bottom edges that ride along the wall-mounted nail to guide the support receiving recess onto the wall-mounted nail, and hanging the article to be hung on a wall on the wall includes lowering the article to be hung on a wall so that at least one of the angled bottom edges of the one-piece hanger and marking device contacts the wall-mounted nail and ride along the wall-mounted nail to guide the support receiving recess onto the wall-mounted nail so that the article to be hung on a wall and one-piece hanger and marking device are mounted to the exact desired location for hanging the article to be hung on a wall.

Another aspect of the invention involves a method of using a hanger and marking device for hanging an article to be hung on a wall, the device comprising a mount to attach the device to a rear of the article, a support marker section including a front surface and a rear surface; a support marker protruding from the rear surface of the support marker section for marking a location for mounting a nail on a wall for mounting the article. The method comprises: holding the article adjacent to the wall and determining the exact desired location on the wall for hanging the article; exerting pressure on the article so as to cause the support marker of the device to create a small indent in the wall at the desired location; temporarily anchoring the article to the wall with the support marker of the device; stepping back from the wall and observing the temporarily anchored article on the wall; removing the article from the wall; nailing the nail into the wall at the location marked by the device; hanging the article on the wall by mounting the device with picture onto the wall-mounted nail; exerting pressure on the article so as to cause the support marker of the device to anchor into the wall while the device with article is mounted onto the wall-mounted nail.

One or more implementations of the aspect of the invention described immediately above include one or more of the following: the support marker section includes a support receiving recess below the support marker that receives the nail for mounting the device and article on the wall-mounted nail; the support marker section includes a top edge and angled bottom edges that ride along the wall-mounted nail to guide the support receiving recess onto the wall-mounted nail; the one-piece hanger and marking device includes a central section with the support marker section; the central section includes opposite sides and the mount includes a pair of flange sections coupled to the central section on the opposite sides; each of the pair of flange sections includes a hole for receiving a fastener to mount the device to the article; the mount includes a flange section coupled to the central section above the central section; the flange section is a semi-circular flange section; and/or the flange section includes a hole for receiving a fastener to mount the device to the article.

A further aspect of the invention involves a method of using a hanger and marking device for hanging an article to be hung on a wall, the device comprising a mount to attach the device to a rear of the article, a support marker section including a front surface and a rear surface; a support marker protruding from the rear surface of the support marker section for marking a location for mounting a nail on a wall for mounting the article. The method comprises: holding the article adjacent to the wall and determining the exact desired location on the wall for hanging the article; exerting pressure on the article so as to cause the support marker of the device to create a small indent in the wall at the desired location; temporarily anchoring the article to the wall with the support marker of the device; stepping back from the wall and observing the temporarily anchored article on the wall; removing the article from the wall; nailing the nail into the wall at the location marked by the device; hanging the article on the wall by mounting the device with picture onto the wall-mounted nail.

One or more implementations of the aspect of the invention described immediately above include one or more of the following: the support marker section includes a support receiving recess below the support marker that receives the nail for mounting the device and article on the wall-mounted nail; the support marker section includes a top edge and angled bottom edges that ride along the wall-mounted nail to guide the support receiving recess onto the wall-mounted nail; the one-piece hanger and marking device includes a central section with the support marker section; the central section includes opposite sides and the mount includes a pair of flange sections coupled to the central section on the opposite sides; each of the pair of flange sections includes a hole for receiving a fastener to mount the device to the article; the mount includes a flange section coupled to the central section above the central section; the flange section is a semi-circular flange section; and/or the flange section includes a hole for receiving a fastener to mount the device to the article.

A still further aspect of the invention involves a method of using a hanger and marking device for hanging an article to be hung on a wall, the device comprising a mount to attach the device to a rear of the article, a support marker section including a front surface and a rear surface; a support marker protruding from the rear surface of the support marker section for marking a location for mounting a nail on a wall for mounting the article. The method comprises: holding the article adjacent to the wall and determining the exact desired location on the wall for hanging the article; exerting pressure on the article so as to cause the support marker of the device to create a small indent in the wall at the desired location; removing the article from the wall; nailing the nail into the wall at the location marked by the device; hanging the article on the wall by mounting the device with picture onto the wall-mounted nail; exerting pressure on the article so as to cause the support marker of the device to anchor into the wall while the device with article is mounted onto the wall-mounted nail.

One or more implementations of the aspect of the invention described immediately above include one or more of the following: the support marker section includes a support receiving recess below the support marker that receives the nail for mounting the device and article on the wall-mounted nail; the support marker section includes a top edge and angled bottom edges that ride along the wall-mounted nail to guide the support receiving recess onto the wall-mounted nail; the one-piece hanger and marking device includes a central section with the support marker section; the central section includes opposite sides and the mount includes a pair of flange sections coupled to the central section on the opposite sides; each of the pair of flange sections includes a hole for receiving a fastener to mount the device to the article; the mount includes a flange section coupled to the central section above the central section; the flange section is a semi-circular flange section; and/or the flange section includes a hole for receiving a fastener to mount the device to the article.

Another aspect of the invention involves a method of using a hanger and marking device for hanging an article to be hung on a wall, the article including the hanger and marking device on a rear of the article, the hanger and marking device including a support marker section including a front surface and a rear surface; a support marker protruding from the rear surface of the support marker section for marking a location for mounting a nail on a wall for mounting the article, the method comprising holding the article adjacent to the wall and determining the exact desired location on the wall for hanging the article; exerting pressure on the article so as to cause the support marker of the device to create a small indent in the wall at the desired location; temporarily anchoring the article to the wall with the support marker of the device; stepping back from the wall and observing the temporarily anchored article on the wall; removing the article from the wall; nailing the nail into the wall at the location marked by the device; hanging the article on the wall by mounting the device with article onto the wall-mounted nail.

One or more implementations of the aspect of the invention described immediately above include one or more of the following: the article includes a left section with a hanger and marking device and a right section with a hanger and marking device, and exerting pressure includes exerting pressure on the article so as to cause the support markers of the devices to create small indents in the wall at locations corresponding to the desired location for hanging the article on the wall; temporarily anchoring includes temporarily anchoring the article to the wall with the support markers of the device; nailing includes nailing nails into the wall at the locations marked by the devices; hanging the article on the wall by mounting the devices with article onto the wall-mounted nails; the hanger and marking devices have a substantially square-shaped flat body with slightly rounded corners, an outer section with two, vertically aligned fastener holes for mounting the device via fasteners to the right section and the left section of the article, and an inner support marker section including the support marker and an arched edge defining an arched support receiving recess below the support marker, and hanging includes hanging the article on the wall by lowering the devices onto the wall-mounted nails so that the arched edges of the arched support receiving recesses ride along the wall-mounted nails to guide the support receiving recesses onto the wall-mounted nails; the article is a frame with an interior space inside the frame and the hanger and marking devices are positioned with respect to the frame so that the outer sections with the fastener holes overlap with the frame and the inner support marker sections protrude inwardly beyond the frame in the interior space inside the frame while allowing the article to sit flush against the wall; the article includes upper corners with L-shaped brackets therein, and the hanger and marking devices are L-shaped, substantially flat, mounted to the L-shaped brackets and disposed in the upper corners, the hanger and marking devices include the support marker and an inclined edge the defines a support receiving recess below the support marker, and hanging includes hanging the article on the wall by lowering the devices onto the wall-mounted nails so that the inclined edges of the support receiving recesses ride along the wall-mounted nails to guide the support receiving recesses onto the wall-mounted nails; the wall-mounted nails includes heads and the upper corners of the article include spaces between the L-shaped brackets and the hanger and marking devices that the heads of the nails are disposed within when the hanger and marking devices are hung on the wall-mounted nails.

An additional aspect of the invention involves a hanger and marking device for hanging an article to be hung on a wall, the article including a rear with a right section and the left section, comprising a substantially square-shaped flat body with slightly rounded corners, the substantially square-shaped flat body comprising an outer section with two, vertically aligned fastener holes for mounting the device via fasteners to the rear of the right section and the left section of the article; an inner support marker section including a rear surface with a support marker protruding from the rear surface for marking a location for mounting a nail on a wall for mounting the article, and an arched edge defining an arched support receiving recess below the support marker, the arched edge configured to ride along the wall-mounted nail to guide the support receiving recesses onto the wall-mounted nail.

In an implementation of the aspect of the invention described immediately above, the hanger and marking device includes a right version for mounting to the rear of the right section of the article and a left version for mounting to the rear of the right section of the article.

A further aspect of the invention involves a hanger and marking device for hanging an article to be hung on a wall, the article including upper right and left corners with L-shaped brackets therein, comprising a L-shaped, substantially flat body mountable to the L-shaped brackets within the upper corners of the article, the body comprising a horizontal section with a fastener hole for mounting the hanger and marking device via a fastener to the L-shaped bracket; and a vertical support marker section with a fastener hole for mounting the hanger and marking device via a fastener to the L-shaped bracket and a rear surface with a support marker protruding from the rear surface for marking a location for mounting a nail on a wall for mounting the article, and an inclined edge defining a support receiving recess below the support marker, the inclined edge configured to ride along the wall-mounted nail to guide the support receiving recesses onto the wall-mounted nail.

In an implementation of the aspect of the invention described immediately above, the hanger and marking device includes a right version for mounting to the L-shaped bracket in the upper right corner of the article and a left version for mounting to the L-shaped bracket in the upper left corner of the article.

DESCRIPTION OF EMBODIMENTS OF THE INVENTION

The accompanying drawings, which are incorporated in and form a part of this specification illustrate embodiments of the invention and together with the description, serve to explain the principles of the invention.

DETAILED DESCRIPTION

With reference to FIGS. 1-11, and initially FIGS. 1-7, an embodiment of a one-piece hanger and marking device ("device") 100 for a picture frame 250 and picture 110 to be hung on a wall 120 (hereinafter "picture 110" or "article to be hung on a wall" or "article") using a wall-mounted nail 130 will be described. Although the device 100 will be described in conjunction with a picture 110, the device 100 may be used with any article to be hung on a wall (e.g., picture, mirror, artwork, arts and crafts, or other article to be hung on a wall). Further, although the device 100 will be described in conjunction with a wall-mounted nail 130, the device 100 may be used with other wall-mounted supports and hangers. As used herein, wall-mounted nail means a wall-mounted nail or other support/hanger that utilizes a wall-mounted nail for mounting the support/hanger to the wall. Further, as used herein, wall refers to any substantially vertical support surface that pictures, mirrors or other articles may be hung on or supported from.

The device 100 has a bracket shape and includes a central section or support marker section 140 parallel with and connected to opposite coplanar flange sections 150 via connecting sections 160 that extend ninety degrees relative to the central section 140 and flange sections 150. The flange sections 150 include holes 170 that receive fasteners (e.g., screws) for mounting the device 100 to a top rear of the picture 110.

The central section 140 includes opposite ends 180, top edge 190, angled bottom edges 200, front surface 210, and rear surface 220. A support marker or marker 230 protrudes rearwardly from the rear surface 220. Although the marker 230 is shown as a rectangular tab that terminates in a substantially flat end 240, in alternative embodiments, the marker 230 may be pointed, sharp-tipped, or have another configuration for marking a small depression in the wall 120 at the desired location. In further embodiments, the marker 230 is adapted to mark the wall with graphite, ink, or other pigmented marking material. Directly beneath the marker 230 in the central section 140 is a support receiving recess 240 that receives the wall-mounted nail 130 for mounting the device 100 and picture 110 on the wall-mounted nail 130. The angled bottom edges 200 ride along the wall-mounted nail 130 to guide the support receiving recess 240 onto the wall-mounted nail 130. The angled bottom edges 200 are angled downwardly, progressing from the support receiving recess 240 to the opposite ends 180.

Figure 12:
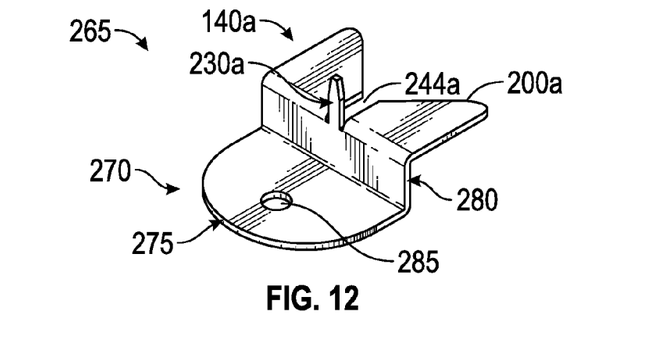
FIG. 12 is a perspective view of another embodiment of a one-piece hanger and marking device.

With reference to FIG. 12, another embodiment of a one-piece hanger and marking device ("device") 265 will be described. Similar features in device 265 to device 100 will be shown with like reference numbers, but with an "a" suffix and will not be described. The description of these similar features above is incorporated by reference herein. The device 265 is similar to the device 100, except instead of the mount(s) being on opposite sides of central section 140, mount or flange section 270 is coupled to and above central section 140a. Substantially semi-circular flange section 275 is parallel with central section 140a and connected to central section 140a via connecting section 280, which extends ninety degrees relative to the central section 140a and flange section 275. The flange section 275 includes hole 285 that receives a fasteners (e.g., screw) for mounting the device 265 to a top rear of the picture 110. The angled bottom edges 200 terminate in curved tips.

Figure 14:
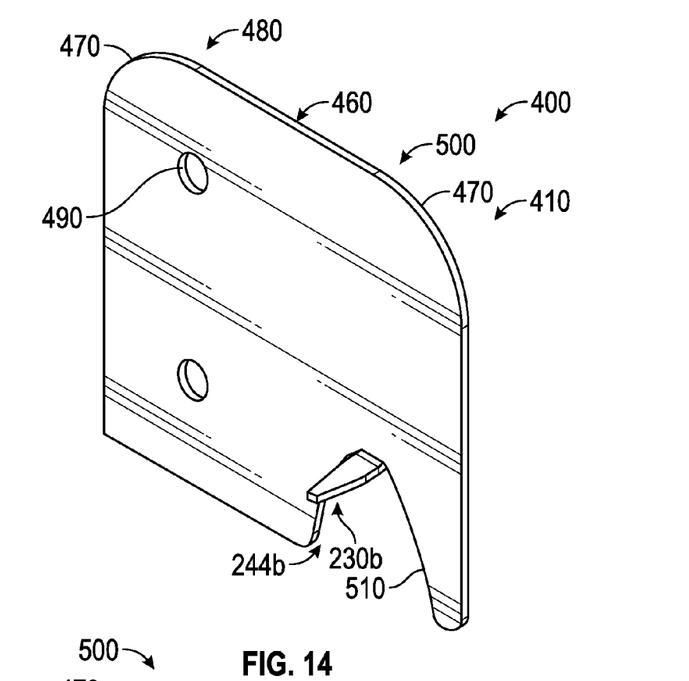
FIGS. 14 and 15 are perspective views of further embodiment of a one-piece hanger and marking device.
Figure 15:
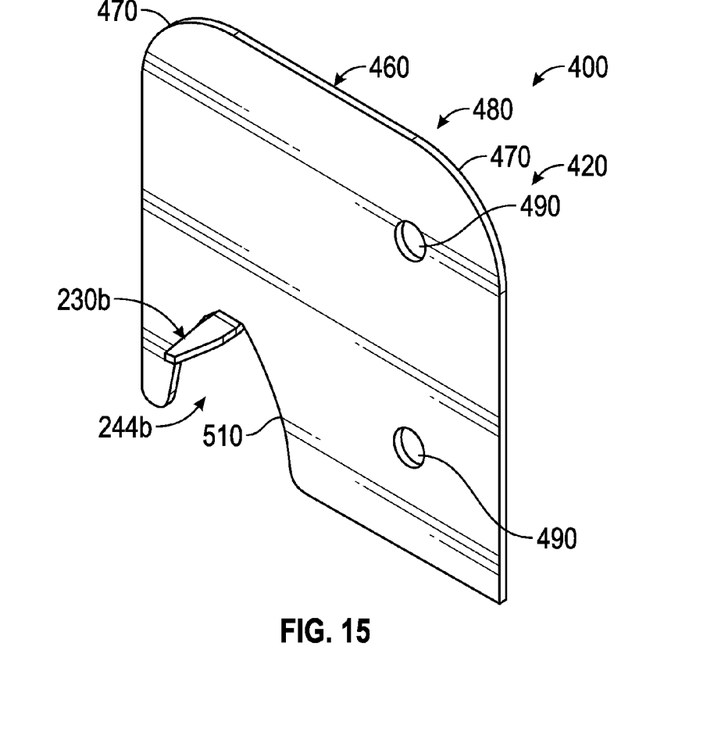
Figure 18:
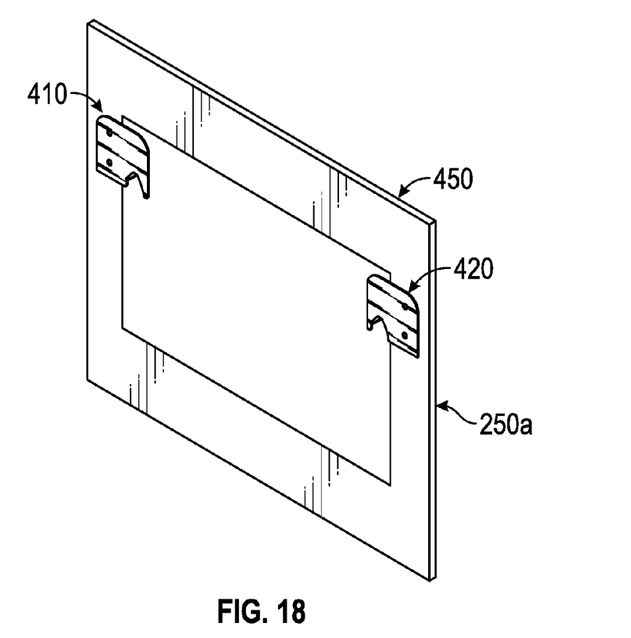
FIG. 18 is a perspective view of a picture frame with the one-piece hanger and marking device of FIGS. 14 and 15.
Figure 19:
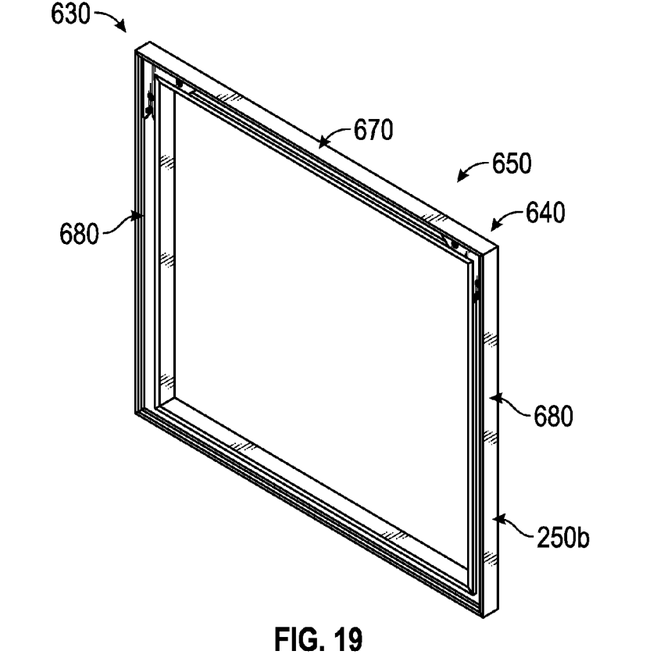
FIG. 19 is a perspective view of a picture frame with the one-piece hanger and marking device of FIGS. 16 and 17.

With reference to FIGS. 14, 15, and 18, a further embodiment of a one-piece hanger and marking device ("device") 400 will be described. The one-piece hanger and marking device 400 includes a left version 410 and a right version 420 for mounting to the left and right rear sides, 430, 440, respectively, of a picture frame, picture, mirror, or similar article (hereinafter "picture frame", "picture", or "article") 450 to be hung on a wall using a wall-mounted nail or support. The device 400 has a flat, substantially square-shaped body 460 with slightly rounded corners 470. An outer (left or right, depending on version 410, 420) section 480 of the device 400 has two, vertically aligned fastener holes 490 for mounting the device 400 via fasteners (e.g., screws) to the left and right rear sides, 430, 440, respectively, of a picture frame 450. An inner section or support marker section 500 of the device 400 includes a support marker 230b for marking a location for placing a nail on the wall. The support marker 230b is located above an arched support receiving recess 244b defined by an arched edge 510 of the inner section 500. The arched edge 510 of the arched support receiving recess 244b rides along the wall-mounted nail to guide the support receiving recess 244b onto the wall mounted nail.

As shown in FIG. 18, left and right devices 410, 420, respectively, are placed on the left and right rear sides, 430, 440, respectively, of the picture frame 450 so that the outer sections 480 with the fastener holes 490 overlap with the frame 450 and the inner section 500 protrudes inwardly beyond the frame 450 in the space inside the frame 450. This placement of the devices 410, 420 with respect to the frame 450 allow the wall-mounted nails that the inner sections 500 are mounted to occupy the space inside of the frame 450 and behind the framed art/picture while allowing the article 450 to sit flush against the wall.

Figure 16:
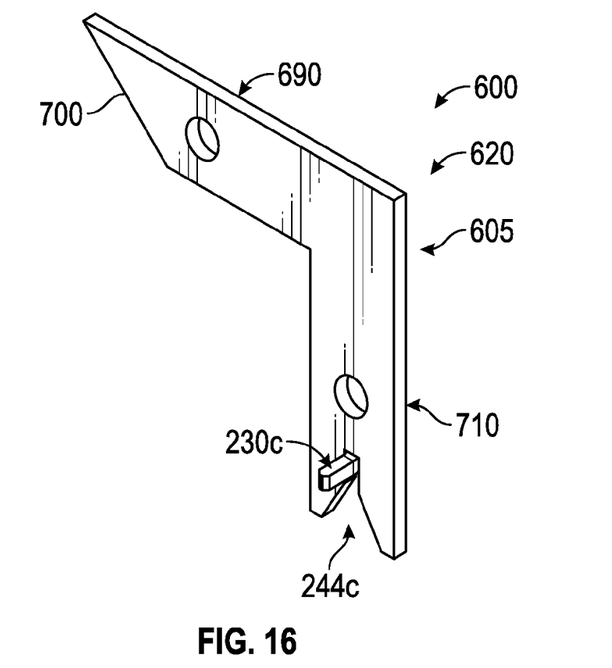
FIGS. 16 and 17 are perspective views of still further embodiment of a one-piece hanger and marking device.
Figure 17:
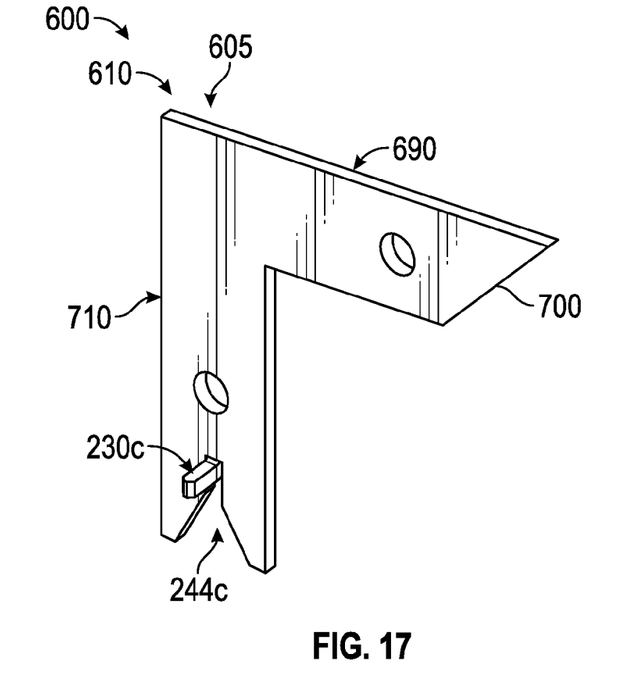
Figure 20:
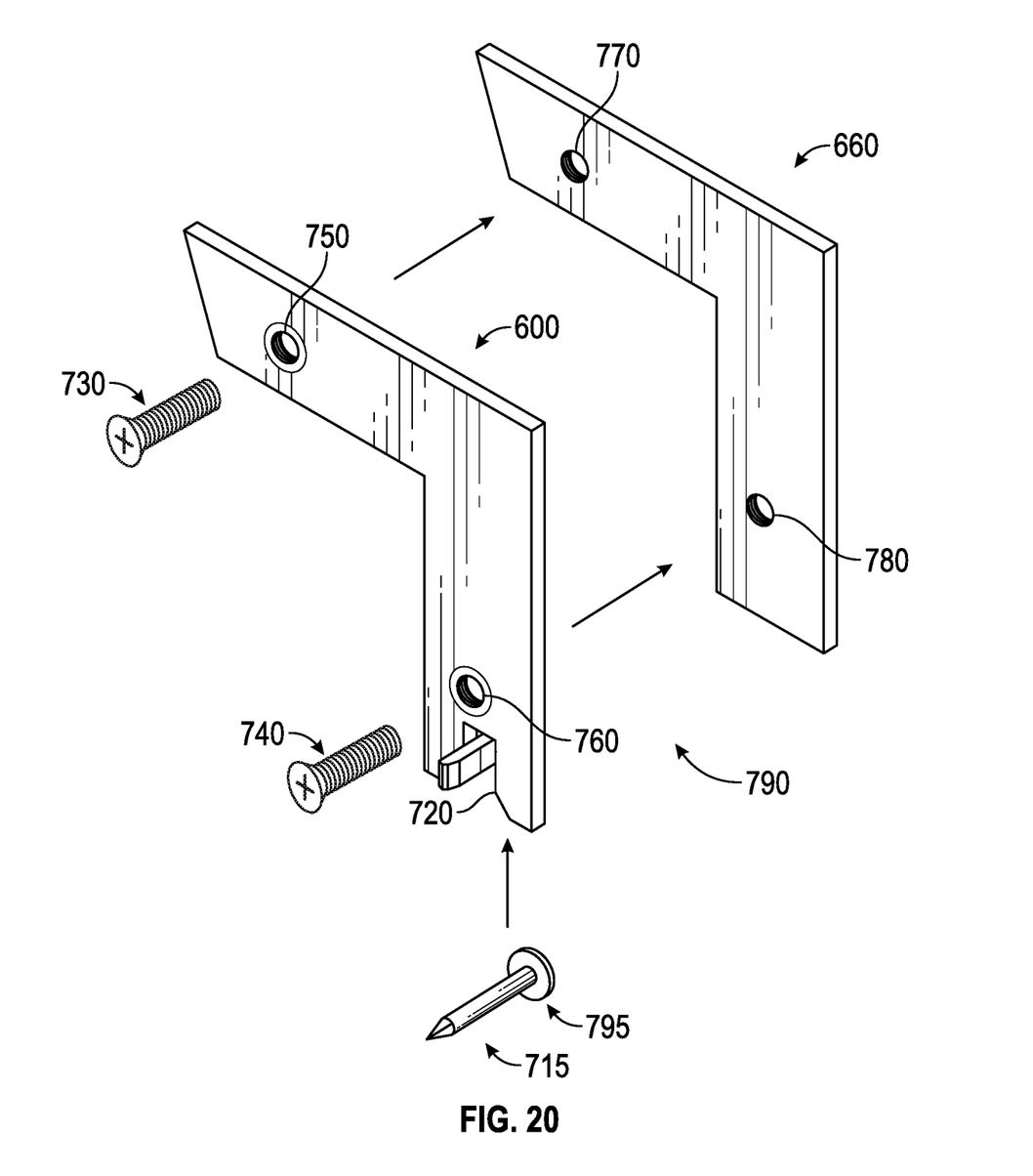
FIG. 20 is an exploded perspective view of the one-piece hanger and marking device of FIGS. 16 and 17 and shows how the one-piece hanger and marking device would be applied to a nail for hanging the picture frame to a wall.

With reference to FIGS. 16, 17, and 20, a further embodiment of a one-piece hanger and marking device ("device") 600 will be described. The one-piece hanger and marking device 600 includes a left version 610 and a right version 620 for mounting to upper left and right rear corners, 630, 640, respectively, of a picture frame, picture, mirror, or similar article (hereinafter "picture frame", "picture", or "article") 650 to be hung on a wall using a wall-mounted nail or support. The device 600 is has a flat and L-shaped body 605. The device 600 is a modification of a corner-inserted bracket 660 (e.g., such as that shown in FIG. 2) used to connect horizontal and vertical sections 670, 680, of the picture frame 650. The device 600 has a horizontal section 690 with a standard squared off end 700 and a vertical section or support marker section 710 with a support marker 230c for marking a location for placing a nail 715 on the wall. Below the support marker 230c is a support receiving recess 244c defined by inclined edge(s) 720. The inclined edge(s) 720 of the support receiving recess 244c rides along the wall-mounted nail 715 to guide the support receiving recess 244c onto the wall mounted nail.

As shown in FIG. 20, the devices 610, 620 are inserted into the respective corners 630, 640 of the frame 650 on top of L-shaped brackets 660. Fasteners (e.g., screws) 730, 740 are received within holes 750, 760 of devices 610, 620 and holes 770, 780 of L-shaped brackets 660 to secure the devices 610, 620 to the respective L-shaped brackets 660 and corners 630, 640 of the frame 650 while allowing a space 790 between the device 610/620 and the bracket 660 to receive a head 795 of the nail 715. The space 790 between the device 610/620 and the bracket 660 allows for hanging while the L-shape configuration of the devices 610, 620 maintains the connecting utility (connecting horizontal and vertical sections 670, 680 of the picture frame 650). When the frame 650 is hung, the head 795 of the wall-mounted nail 715 rests in the space/gap 790 between the device 610/620 and the bracket 660.

In one or more alternative embodiments of the hanger and marking device 100, 265, 400, 600 described above, the picture or article 110, 450, 650 includes the hanger and marking device 100, 265, 400, 600 as part of (or manufactured with) the frame of the picture or article 110, 450, 650.

With reference to FIGS. 8-11 and 13, a method 300 of using the device 100, 265, 400, 600 will now be described.

Figure 1:
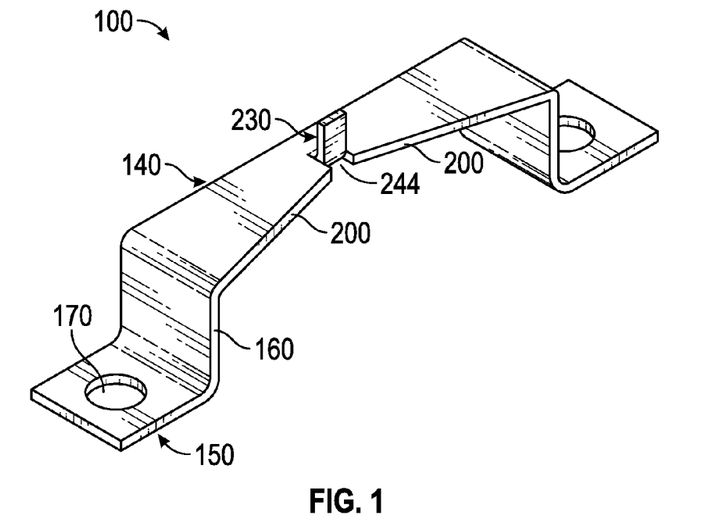
FIG. 1 is a perspective view of an embodiment of a one-piece hanger and marking device.
Figure 2:
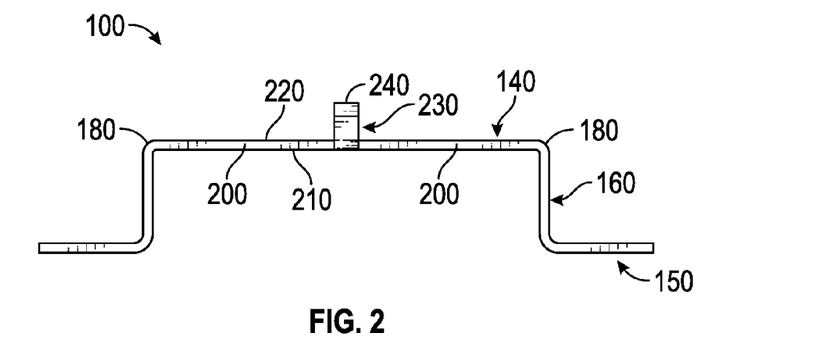
FIG. 2 is a front elevational view of the one-piece hanger and marking device of FIG. 1.
Figure 3:
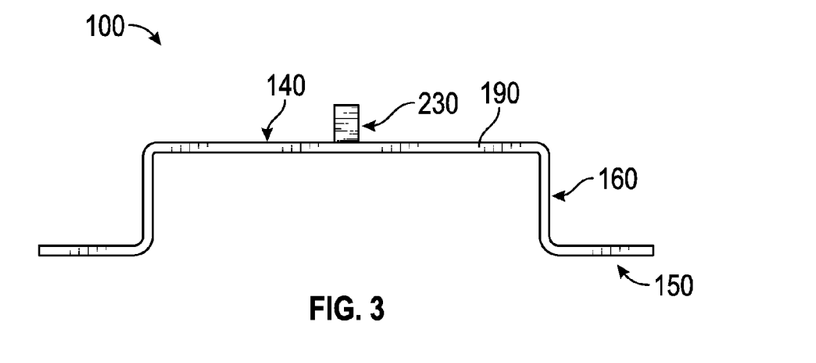
FIG. 3 is a rear elevational view of the one-piece hanger and marking device of FIG. 1.
Figure 4:
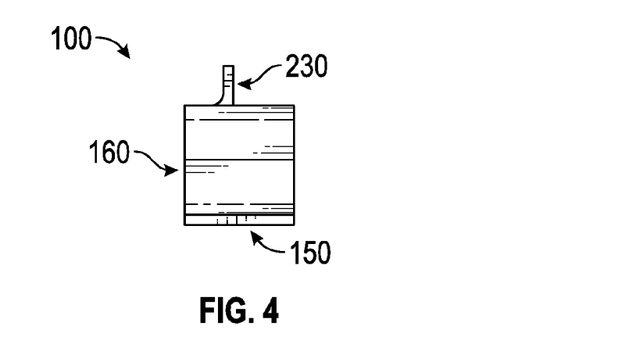
FIG. 4 is a left elevational view of the one-piece hanger and marking device of FIG. 1.
Figure 5:
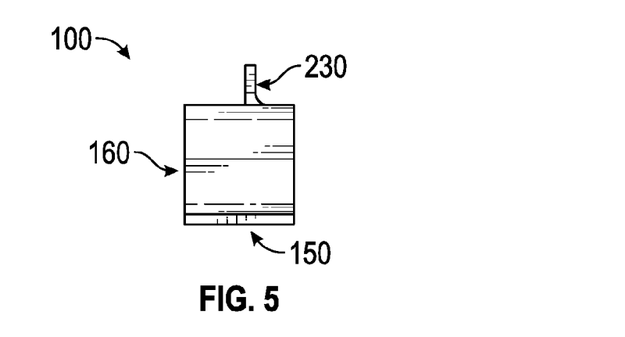
FIG. 5 is a right elevational view of the one-piece hanger and marking device of FIG. 1.
Figure 6:
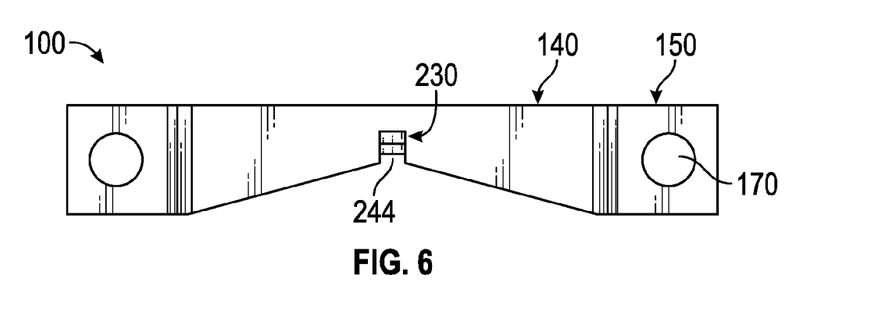
FIG. 6 is a top plan view of the one-piece hanger and marking device of FIG. 1.
Figure 7:
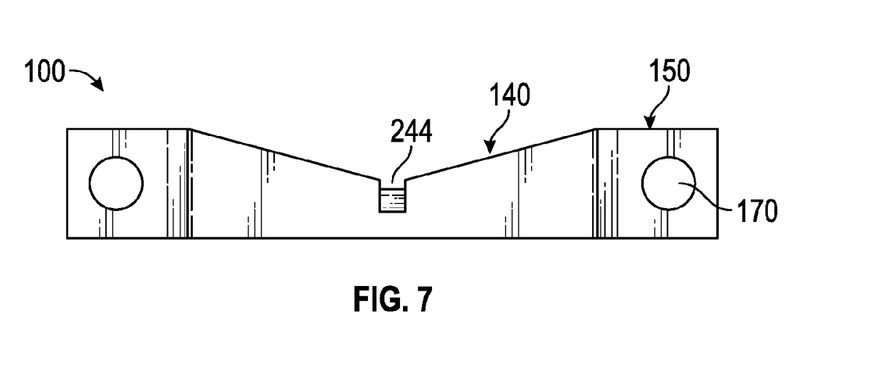
FIG. 7 is a bottom plan view of the one-piece hanger and marking device of FIG. 1.
Figure 8:
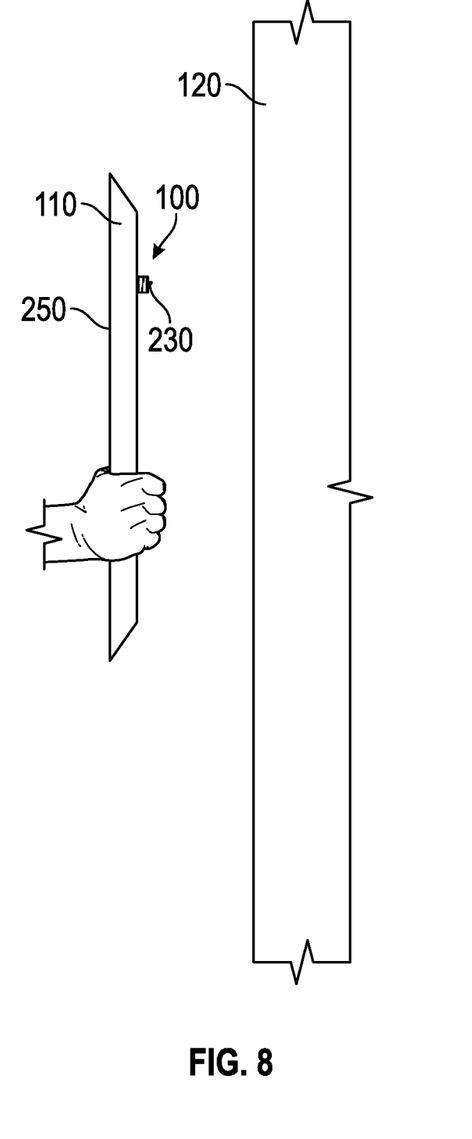
FIG. 8 is a right side elevational view of the one-piece hanger and marking device on a picture and shows the picture being held adjacent to the wall and positioned to an exact desired location for hanging the picture.
Figure 13:
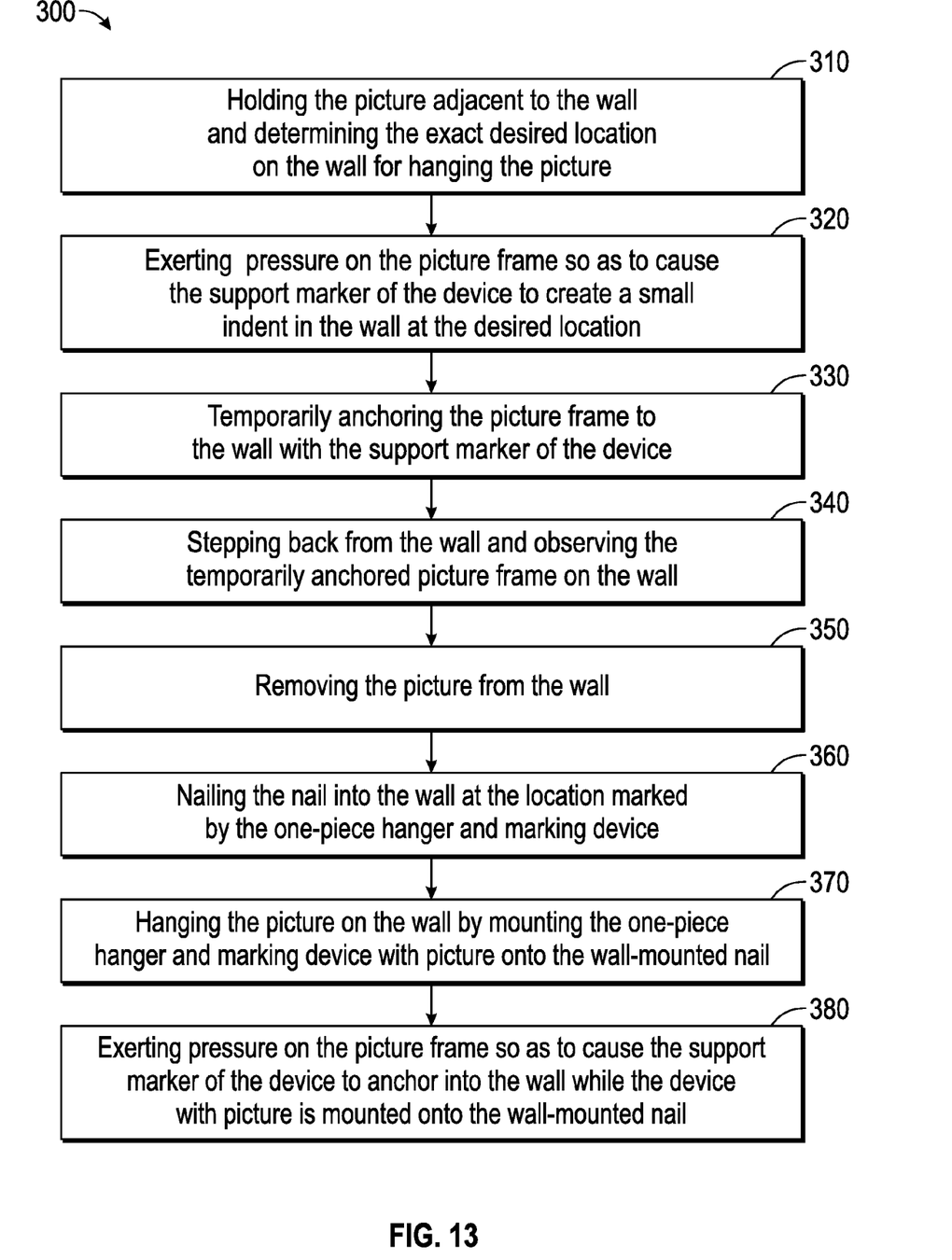
FIG. 13 is a flow chart showing an exemplary method of hanging a picture frame with the device.

As shown in FIG. 8 and in step 310 of FIG. 13, with the device 100, 265, 400, 600 mounted on the top rear of the picture or article 110 (or in the embodiments of FIGS. 14-20, with two devices 400, 600 mounted on the left and right, 430, 440 or upper left and right rear corners, 630, 640 of the article 450, 650), a user holds the picture/article 110, 450, 650 adjacent to the wall 120 and determines the exact desired location for hanging the picture 110, 450, 650.

Figure 9A:
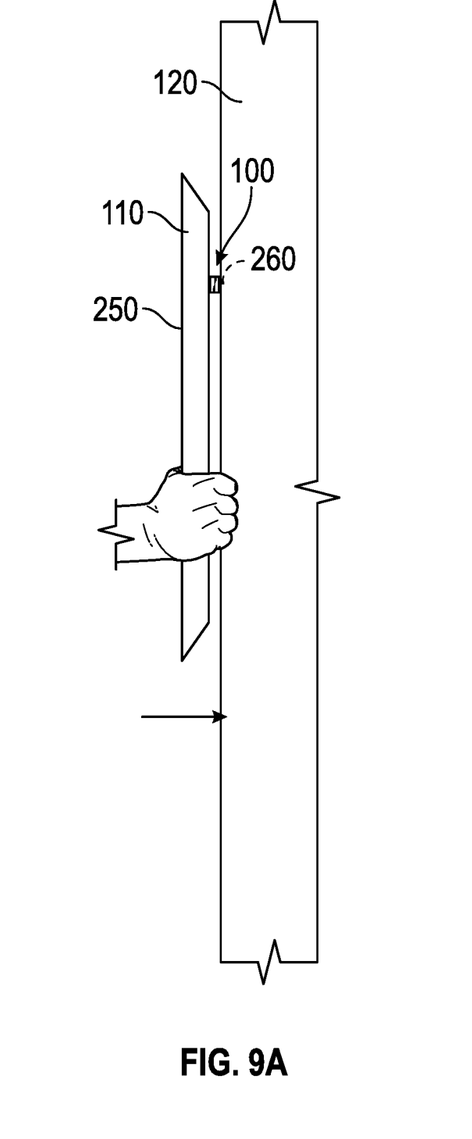
FIG. 9A is a right side elevational view, similar to FIG. 8, and shows the picture at the exact desired location and pressure exerted on a picture frame causing the support marker of the device to create a small indent in the wall at the desired location.

As shown in FIG. 9A and in step 320 of FIG. 13, when the desired wall location is determined, pressure exerted on picture frame 250, 250a, 250b in the direction of the arrow causes the support marker 230, 230a, 230b, 230c of the device 100, 265, 400, 600 to create a small indent 260 in the wall 120 at the desired location.

Figure 9B:
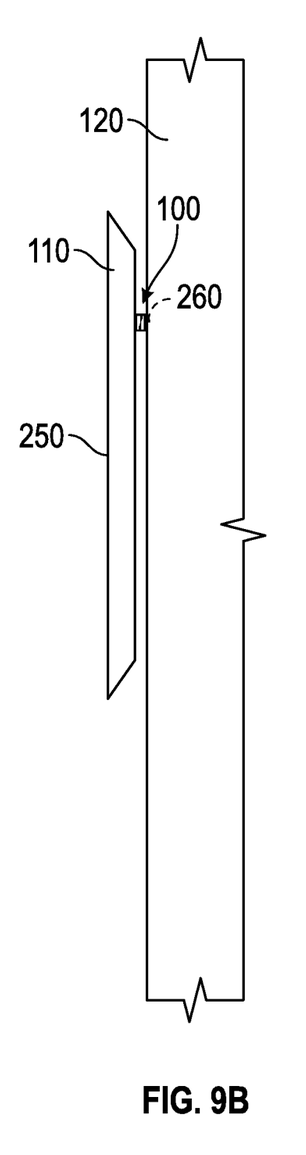
FIG. 9B is a right side elevational view, similar to FIG. 8, and shows temporarily anchoring the picture frame to the wall with the support marker of the device.

As shown in FIG. 9B and in step 330 of FIG. 13, the picture frame 250, 250a, 250b is temporarily anchored to the wall 120 with the support marker 230, 230a, 230b, 230c of the device 100, 265, 400. 600.

Figure 9C:
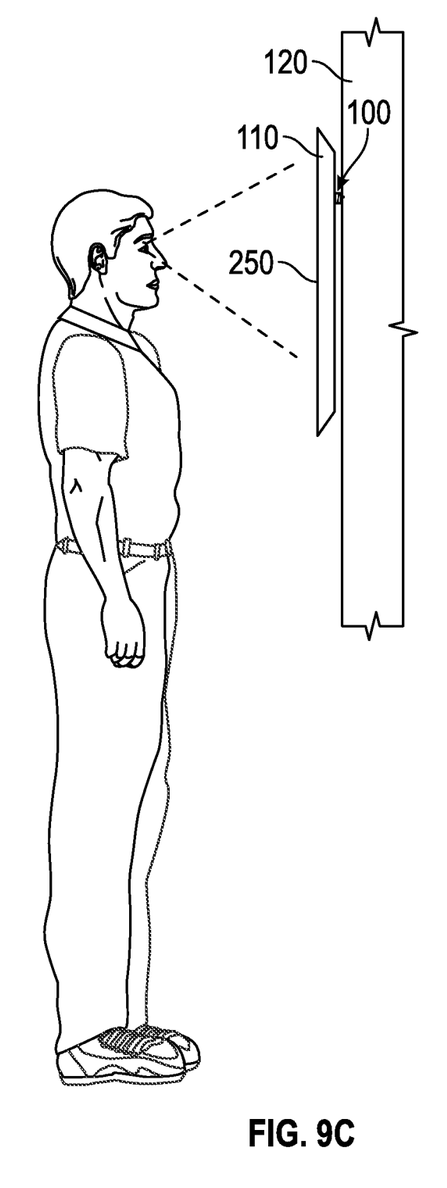
FIG. 9C is a right side elevational view and shows a user stepping back from the wall and observing the temporarily anchored picture frame on the wall.

As shown in FIG. 9C and in step 340 of FIG. 13, a user steps back from the wall and observes the temporarily anchored picture frame 250, 250a, 250b on the wall 120.

Figure 10A:
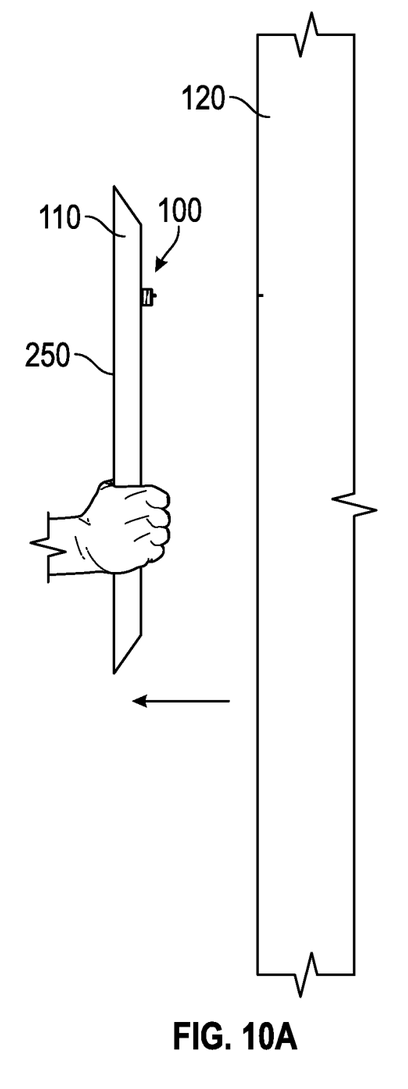
FIG. 10A is a right side elevational view, similar to FIG. 8, and shows the picture being removed from the wall.

As shown in FIG. 10A and in step 350 of FIG. 13, the picture 110, 450, 650 is removed from the wall 120.

Figure 10B:
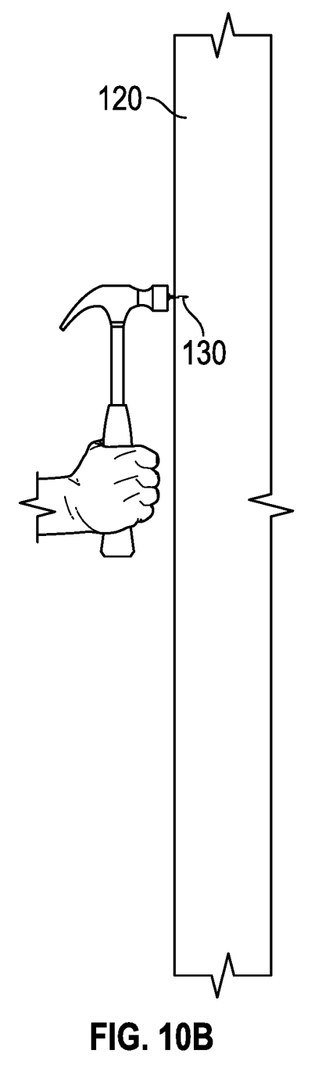
FIG. 10B is a right side elevational view, similar to FIG. 8, and shows hammering a nail into the wall at the location marked by the device.

As shown in FIG. 10B and in step 360 of FIG. 13, the nail(s) 120, 715 or other support(s) is hammered/nailed into the wall 120 at the location(s) marked by the device 100, 265, 400, 600.

Figure 10C:
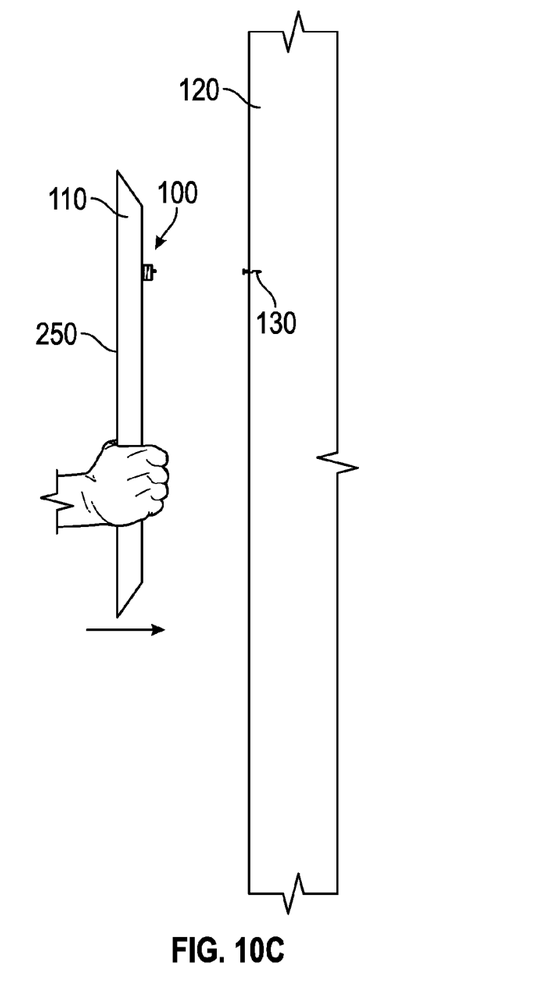
FIG. 10C is a right side elevational view, similar to FIG. 8, and shows hanging the picture on the wall by mounting the one-piece hanger and marking device with picture onto the wall-mounted nail.

As shown in FIG. 10C and in the step 370 of FIG. 13, the picture frame 250, 250a, 250b/picture 110, 450, 650 is hanged on the wall 120 by mounting the one-piece hanger and marking device 100, 265, 400, 600 with picture 110, 450, 650 onto the wall-mounted nail 120. The picture 110, 450, 650 is placed against the wall 120 with the device 100, 265, 400, 600 above the wall-mounted nail 130, and the picture 110, 450, 650 with device 100, 265, 400, 600 is let down onto the wall-mounted nail 130, the angled bottom edges 200, 510, 720 riding along the wall-mounted nail(s) 130, 715 to guide the support receiving recess 244, 244a, 244b, 244c onto the wall-mounted nail(s) 130, 715 so that the picture 110, 450, 650 and device 100, 265, 400, 600 are mounted to the exact desired location for hanging the picture 110, 450, 650.

Figure 11:
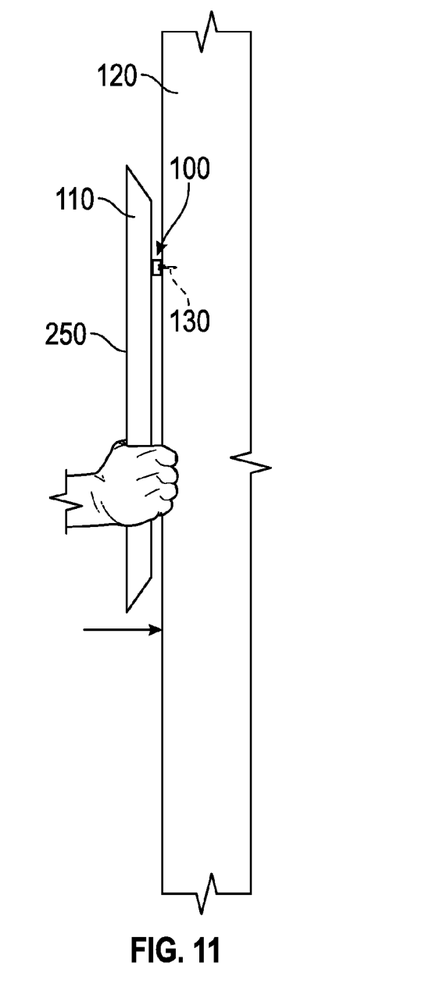
FIG. 11 is a right side elevational view, similar to FIG. 8, and shows exerting pressure on the picture frame so as to cause the support marker of the device to anchor into the wall while the device with picture is mounted onto the wall-mounted nail.

As shown in FIG. 11 and in the step 380 of FIG. 13, pressure is exerted on the picture frame 250, 250a, 250b so as to cause the support marker 230, 230a, 230b, 230c of the device 100, 265, 400, 600 to anchor into the wall 120 while the device 100, 265, 400, 600 with picture 110, 450, 650 is mounted onto the wall-mounted nail(s) 130, 715.

In one or more alternative methods of the method of using the hanger and marking device 100, 265, 400, 600 described above, one or more of the above-recited steps are not included and/or one more steps not described are added. For example, but not by way of limitation, an alternative method of using the hanger and marking device 100, 265, 400, 600 includes steps 310 through 370 recited above, but does not include step 380, exerting pressure on the picture frame 250, 250a, 250b so as to cause the support marker 230, 230a, 230b, 230c of the device 100, 265, 400, 600 to anchor into the wall 120 while the device 100, 265, 400, 600 with picture 110, 450, 650 is mounted onto the wall-mounted nail(s) 130, 715. Another alternative method of using the hanger and marking device 100, 265, 400, 600 includes steps 310, 320, and 350-380, but does not include steps 330 and 340, temporarily anchoring the picture frame 250, 250a, 250b to the wall 120 with the support marker 230, 230a, 230b, 230c of the device 100, 265, 400, 600 and stepping back from the wall and observing the temporarily anchored picture frame 250, 250a, 250b on the wall 120.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment.

Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

I claim:

1. A method of using a hanger and marking device for hanging an article to be hung on a wall, the article including the hanger and marking device on a rear of the article, the hanger and marking device including a support marker section including a front surface and a rear surface; a support marker protruding from the rear surface of the support marker section for marking a location for mounting a nail on a wall for mounting the article, and a support receiving recess adjacent to and contiguous with the support marker, the method comprising:

holding the article including the hanger and marking device on a rear of the article adjacent to the wall and determining the exact desired location on the wall for hanging the article;

exerting pressure on the article so as to cause the support marker of the device to create a small indent in the wall at the desired location;

temporarily anchoring the article to the wall with the support marker of the device;

stepping back from the wall and observing the temporarily anchored article on the wall;

removing the article from the wall;

nailing the nail into the wall at the location marked by the device;

hanging the article on the wall by mounting the device with article onto the wall-mounted nail, wherein the article includes a left section with the hanger and marking device and a right section with the hanger and marking device, and the method further comprising providing the article with the left section with the hanger and marking device and the right section with the hanger and marking device;

exerting pressure includes exerting pressure on the article so as to cause the support marker of the hanger and marking device of the left section and the support marker of the hanger and marking device of the right section to create small indents in the wall at locations corresponding to the desired location for hanging the article on the wall;

temporarily anchoring includes temporarily anchoring the article to the wall with the support markers of the hanger and marking device of the left section and the hanger and marking device of the right section;

nailing includes nailing nails into the wall at the locations marked by the hanger and marking device of the left section and the hanger and marking device of the right section;

hanging the article on the wall by mounting the hanger and marking device of the left section and the hanger and marking device of the right section with article onto the wall-mounted nails.

2. The method of claim 1, wherein the hanger and marking devices have a square-shaped flat body with slightly rounded corners, an outer section with two, vertically aligned fastener holes for mounting the device via fasteners to the right section and the left section of the article, and an inner support marker section including the support marker and an arched edge defining an arched support receiving recess below the support marker, and hanging includes hanging the article on the wall by lowering the devices onto the wall-mounted nails so that the arched edges of the arched support receiving recesses ride along the wall-mounted nails to guide the support receiving recesses onto the wall-mounted nails.

3. A method of using a hanger and marking device for hanging an article to be hung on a wall, the article including a rear with a left section with a hanger and marking device and a right section with a hanger and marking device, each hanger and marking device including a support marker section including a front surface and a rear surface; a support marker protruding from the rear surface of the support marker section for marking a location for mounting a nail on a wall for mounting the article, the method comprising:

holding the article adjacent to the wall and determining the exact desired location on the wall for hanging the article;

exerting pressure on the article so as to cause the support markers of the devices to create small indents in the wall at locations corresponding to the desired location for hanging the article on the wall;

temporarily anchoring the article to the wall with the support markers of the device;

stepping back from the wall and observing the temporarily anchored article on the wall;

removing the article from the wall;

nailing nails into the wall at the locations marked by the device;

hanging the article on the wall by mounting the device with article onto the wall-mounted nails, wherein the article is a frame with an interior space inside the frame and the hanger and marking devices are positioned with respect to the frame so that the outer sections with the fastener holes overlap with the frame and the inner support marker sections protrude inwardly beyond the frame in the interior space inside the frame while allowing the article to sit flush against the wall.

4. A method of using a hanger and marking device for hanging an article to be hung on a wall, the article including a rear with a left section with a hanger and marking device and a right section with a hanger and marking device, each hanger and marking device including a support marker section including a front surface and a rear surface; a support marker protruding from the rear surface of the support marker section for marking a location for mounting a nail on a wall for mounting the article, the method comprising:

holding the article adjacent to the wall and determining the exact desired location on the wall for hanging the article;

exerting pressure on the article so as to cause the support markers of the devices to create small indents in the wall at locations corresponding to the desired location for hanging the article on the wall;

temporarily anchoring the article to the wall with the support markers of the device;

stepping back from the wall and observing the temporarily anchored article on the wall;

removing the article from the wall;

nailing nails into the wall at the locations marked by the device;

hanging the article on the wall by mounting the device with article onto the wall-mounted nails, wherein the article includes upper corners with L-shaped brackets therein, and the hanger and marking devices are L-shaped, flat, mounted to the L-shaped brackets and disposed in the upper corners, the hanger and marking devices include the support marker and an inclined edge the defines a support receiving recess below the support marker, and hanging includes hanging the article on the wall by lowering the devices onto the wall-mounted nails so that the inclined edges of the support receiving recesses ride along the wall-mounted nails to guide the support receiving recesses onto the wall-mounted nails.

5. The method of claim 4, wherein the wall-mounted nails include heads and the upper corners of the article include spaces between the L-shaped brackets and the hanger and marking devices that the heads of the nails are disposed within when the hanger and marking devices are hung on the wall-mounted nails.

* * * * *